United States Patent Office 3,481,931
Patented Dec. 2, 1969

3,481,931
ACENAPHTHO[1,2-b]QUINOXALINE,7,12-
DIOXIDE
Donald L. Vivian, 1237 E. Drachman,
Tucson, Ariz. 85719
No Drawing. Filed June 1, 1965, Ser. No. 460,550
Int. Cl. C07d 51/78
U.S. Cl. 260—250                                    1 Claim

ABSTRACT OF THE DISCLOSURE

The heterocyclic compound acenaphtho[1,2-b]quinoxaline,7,12-dioxide is disclosed. This compound inhibits growth of carcinomata in laboratory mice.

---

This invention relates to a novel heterocyclic di-N-oxide which inhibits growth of carcinomata in laboratory mice.

The compound of the invention is acenaphtho[1,2-b]quinoxaline,7,12-dioxide having the structural formula

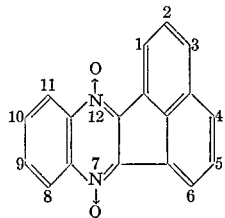

This novel compound gives satisfactory control of the carcinoma "Sarcoma 180" (Code "SA," Cancer Chemotherapy National Service Center, National Cancer Institute, Bethesda, Md.) in laboratory mice.

The compound is prepared as follows:

The base is prepared by the reaction of 1,2-phenylenediamine with acenaphthoquinone in a suitable reaction medium, for example ethanol or acetic acid, as follows:

(1)

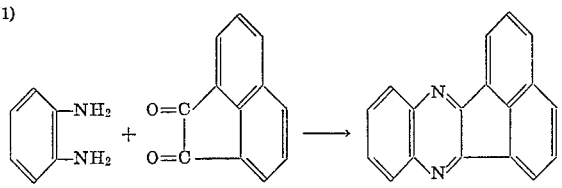

followed by oxidation (see, e.g., Evans et al., U.S. 2,518,130) of the base with a "per" compound, suitably hydrogen peroxide, in a glacial acetic acid, viz, (2)

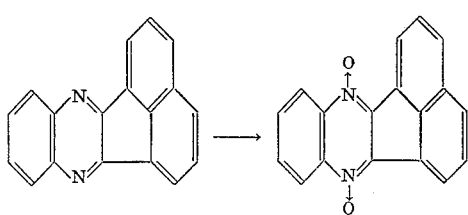

after which the compound is recovered from the reaction medium by precipitation, filtration, washing and recrystallization.

The compound is golden-yellow in color, melts with decomposition at 227–228° C. (corr.). Ultimate analysis of the compound confirms the empirical formula $C_{18}H_{10}N_2O_2$.

The following examples will serve to better illustrate the invention and the presently preferred practice thereof.

EXAMPLE 1.—PREPARATION OF THE BASE

Two grams of acenaphthoquinone are dissolved in 800 cc. of 95% ethanol. The resulting solution is refluxed for 64 hours with 5 grams of orthophenylenediamine dissolved in 100 cc. of 95% ethanol. The base is precipitated by adding an equal volume of distilled water, cooling to room temperature, filtering and washing the precipitate and, finally, air-drying to yield 2.35 grams of the base. The base melts at 241–242° C. (corr.) compared with the uncorrected literature value of 234° C. (See Atti accad. Lincei [5] 81, 210 (1899).)

EXAMPLE 2.—PREPARATION OF THE
DI-N-OXIDE

Six and nine-tenths grams of the base prepared in Example 1 is dissolved in 910 cc. of glacial acetic acid at 50° C. to which is then added 91 cc. of 30% hydrogen peroxide. The reaction mixture is heated for 16 hours at 50° C. The heated reaction mixture is then diluted to three times its original volume with distilled water and heated to 50–60° C. The acenaphtho[1,2-b]quinoxaline,7,12-dioxide precipitates as golden-yellow leaflets. On washing free of acetic acid and air-drying, these leaflets weigh 7.14 grams, darken slightly at 200°, shrink at 216–218° C. and melt with decomposition at 220–221° C. After three recrystallizations from 95% ethanol, the compound melts with decomposition at 227–228° C. (corr.). Ultimate analysis checks with the empirical formula $C_{18}H_{10}N_2O_2$.

EXAMPLE 3.—TUMOR CONTROL IN
LABORATORY ANIMALS

Laboratory mice (CCNSC Code "01-Swiss") having implanted tumors (CCNSC Code "SA-Sarcoma 180") were treated by intraperitoneal injection of acenaphtho-[1,2-b]quinoxaline,7,12-dioxide in a methyl cellulose vehicle by two different testing affiliates of the Cancer Chemotherapy National Service Center. The compound of the invention gave "satisfactory control" in "Stage 1 of Sequential Screen" (CCNSC Code 11), in Stage 2 of "Sequential Confirmation" (CCNSC Code 20), and in "Multiple Dose Assay" (CCNSC Code 22). It also gave a satisfactory "Second Confirmation Test" (CCNSC Code 20A), as well as "Activity Confirmed" (CCNSC Code 20C).

Having described my invention and the presently preferred practice thereof, I claim:

1. The acenaphtho[1,2-b]quinoxaline,7,12-dioxide.

References Cited

UNITED STATES PATENTS 3,311,626    3/1967    Wendt et al. _____ 260—250

OTHER REFERENCES

Berichte Deutsche Chemische Gesellschaft, vol. 43, pp. 439–445 (1910).

NICHOLAS S. RIZZO, Primary Examiner

U.S. Cl. X.R.

260—999